(12) United States Patent
Yin

(10) Patent No.: US 11,714,252 B2
(45) Date of Patent: Aug. 1, 2023

(54) LENS UNIT, PROCESSING METHOD FOR LENS UNIT AND ELECTRONIC DEVICE

(71) Applicant: BEIJING XIAOMI MOBILE SOFTWARE CO., LTD., Beijing (CN)

(72) Inventor: Zhidong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 533 days.

(21) Appl. No.: 16/459,593

(22) Filed: Jul. 1, 2019

(65) Prior Publication Data

US 2020/0012066 A1   Jan. 9, 2020

(30) Foreign Application Priority Data

Jul. 5, 2018 (CN) .......................... 201810731346.7
Jul. 5, 2018 (CN) .......................... 201821064353.8

(51) Int. Cl.
*G02B 7/02* (2021.01)
*H04N 23/55* (2023.01)
*H04N 23/57* (2023.01)

(52) U.S. Cl.
CPC ............. *G02B 7/022* (2013.01); *G02B 7/021* (2013.01); *H04N 23/55* (2023.01); *H04N 23/57* (2023.01)

(58) Field of Classification Search
CPC .......... G02B 7/022; G02B 7/021; G02B 7/02; G02B 13/006; H04N 5/2254; H04N 5/2257; H04N 5/225
USPC .................................................. 359/819–830
See application file for complete search history.

(56) References Cited

U.S. PATENT DOCUMENTS

| | | | |
|---|---|---|---|
| 8,570,672 B2 * | 10/2013 | Lin | G02B 7/021 359/811 |
| 2011/0063739 A1 | 3/2011 | Maxell | |
| 2015/0103407 A1 | 4/2015 | Chen | |
| 2015/0293330 A1 | 10/2015 | Gutierrez | |
| 2016/0349475 A1 | 12/2016 | Horiuchi et al. | |
| 2020/0162648 A1 * | 5/2020 | Wang | B29D 11/0048 |

FOREIGN PATENT DOCUMENTS

| | | | |
|---|---|---|---|
| CN | 104516081 A * | 4/2015 | ............. G02B 7/021 |
| CN | 207321405 U | 5/2018 | |
| CN | 207528984 U | 6/2018 | |
| EP | 2933670 A1 | 10/2015 | |
| JP | 2000347088 A | 12/2000 | |
| JP | 2004219742 A | 8/2004 | |
| JP | 2012083439 A * | 4/2012 | |
| JP | 2013125161 A * | 6/2013 | |

(Continued)

OTHER PUBLICATIONS

Extended European Search Report (EESR) in EP 19184694.8 dated Jul. 14, 2021.

(Continued)

*Primary Examiner* — Mahidere S Sahle
(74) *Attorney, Agent, or Firm* — Syncoda LLC; Feng Ma

(57) ABSTRACT

A lens unit includes a lens barrel having a barrel wall and a snap groove surrounded and formed by the barrel wall; and a first lens group snap-fitted and secured in the snap groove, wherein the first lens group has a light-incident end on which external light incidents; the light-incident end protrudes from an end surface of the barrel wall; and the first lens group includes at least one lens.

18 Claims, 4 Drawing Sheets

(56) References Cited

FOREIGN PATENT DOCUMENTS

| JP | 2013125161 A | 6/2013 | | |
|---|---|---|---|---|
| JP | 2015215595 A | 12/2015 | | |
| KR | 20080023830 A | 3/2008 | | |
| KR | 20180033701 A | 4/2018 | | |
| WO | 2013047198 A1 | 4/2013 | | |
| WO | WO-2019233478 A1 * | 12/2019 | ............. | G03B 17/17 |

OTHER PUBLICATIONS

ISR in PCTCN2019092348 dated Sep. 27, 2019.
EESR in EP application 19184694.8 dated Dec. 12, 2019.
OA for KR application 10-2019-7024465, dated Jan. 13, 2021.
First OA for RU application 2019127421, dated Jun. 4, 2020.
OA for JP application 2019-545977, dated Oct. 13, 2020.

* cited by examiner

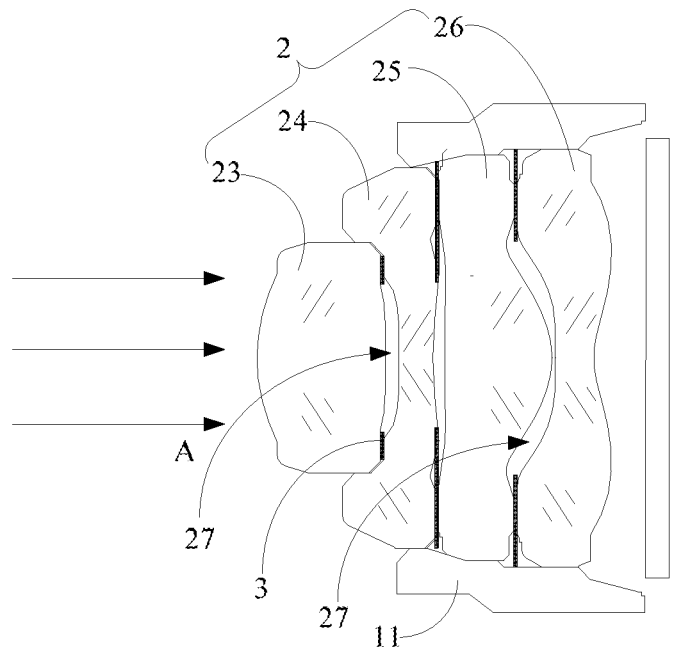

FIG. 3

```
┌─────────────────────────────────────────────────────────────┐
│ Securing a lens group in a snap groove within a lens barrel,│
│ and causing one end of the lens group on which external    │ ─ 401
│ light is incident to protrude from an end surface of the   │
│ lens barrel                                                 │
└─────────────────────────────────────────────────────────────┘
                              │
                              ▼
┌─────────────────────────────────────────────────────────────┐
│ Subjecting the lens group to a matting treatment to obtain │ ─ 402
│ the lens                                                    │
└─────────────────────────────────────────────────────────────┘
```

FIG. 4

LENS UNIT, PROCESSING METHOD FOR LENS UNIT AND ELECTRONIC DEVICE

CROSS-REFERENCE TO RELATED APPLICATIONS

The present application claims priority to Chinese Patent Application Nos. CN 201810731346.7 and CN 201821064353.8, both filed on Jul. 5, 2018, the disclosures of which are hereby incorporated by reference in their entirety.

BACKGROUND

Currently, with rapid development of various technologies in the field of terminals, users' demands on the functions and aesthetics of electronic devices are gradually increasing. For example, users want to be able to take selfies or videos through a front camera in an electronic device where the front display area of the electronic device is as large as possible.

SUMMARY

The present disclosure relates to the technical field of terminals, and more particularly, to a lens unit, a processing method for a lens unit, and an electronic device.

Embodiments of the present disclosure provide a lens unit, a processing method for a lens unit, and an electronic device, to address problems in the related art.

In a first aspect, embodiments of the present disclosure provide a lens unit. The lens unit includes: a lens barrel including a barrel wall and a snap groove surrounded and formed by the barrel wall; and a first lens group snap-fitted and secured in the snap groove, wherein said first lens group has a light-incident end on which external light incident; said light-incident end protrudes from an end surface of the barrel wall; and the first lens group includes at least one lens.

In some preferred embodiments, the lens unit further includes a second lens group including at least one lens, the first lens group and the second lens group are spaced apart, and the first lens group and the second lens group are snap-fitted in corresponding snap grooves respectively, in which the external light is incident from the first lens group to the second lens group, and at least a part of the first lens group protrudes from the end surface of the lens barrel.

In some embodiments, when the first lens group includes a plurality of lenses, the plurality of lenses are connected sequentially along an incident direction of the external light.

In some embodiments, the first lens group includes a first lens and a second lens connected with the first lens; the external light is incident from the first lens to the second lens; and the second lens is snap-fitted and secured in the snap groove.

In some embodiments, the first lens group includes a plurality of lenses arranged sequentially, and adjacent lenses among the plurality of lenses are fixedly connected.

In some embodiments, the first lens group includes a recessed portion, and the recessed portion is formed by a lens contained in the first lens group being recessed along an incident direction of the light, to position an adjacent lens.

In some embodiments, adjacent lenses in a connected state contained in the first lens group are connected by bonding.

In some embodiments, the lens unit further includes a light shielding layer, and the light shielding layer is attached to an edge area of at least one lens contained in the first lens group to block stray light.

In a second aspect, embodiments of the present disclosure provide a processing method for a lens unit. The lens unit includes a lens barrel and a first lens group including at least one lens. The processing method includes: securing the first lens group in a first snap groove within the lens barrel, and causing one end of the first lens group on which external light is incident to protrude from an end surface of the lens barrel; and subjecting the first lens group to a matting treatment to obtain the lens unit.

In some preferred embodiments, the first lens group includes a plurality of lenses arranged sequentially; and the step of securing the first lens group in the first snap groove within the lens barrel includes: connecting adjacent lenses to obtain the first lens group, and securing the first lens group in the first snap groove.

In some embodiments, the lens unit further includes a second lens group including at least one lens, the first lens group and the second lens group are spaced apart, and the external light is incident from the first lens group to the second lens group; in which secure the second lens group in a second snap groove within the lens barrel before securing the first lens group in the first snap groove within the lens barrel, and cause a part of the first lens group to protrude from the end surface of the lens barrel.

In some embodiments, when the first lens group includes a plurality of lenses, the step of securing the first lens group in the first snap groove within the lens barrel includes: connecting adjacent lenses to obtain the first lens group.

In some embodiments, the step of connecting adjacent lenses includes bonding opposite surfaces of the adjacent lenses by glue.

In a third aspect, embodiments of the present disclosure provide an electronic device. The electronic device includes: a screen assembly and a lens unit including: a lens barrel including a barrel wall and a snap groove surrounded and formed by the barrel wall, and a first lens group snap-fitted and secured in the snap groove and having an end on which external light is incident protruding from an end surface of the barrel wall, and the first lens group including at least one lens; or a lens unit obtained by a processing method including: securing a first lens group in a snap groove within a lens barrel, and causing one end of the first lens group on which external light is incident to protrude from an end surface of the lens barrel, and subjecting the first lens group to a matting treatment to obtain the lens unit; in which the screen assembly includes an opening provided for a part of the first lens group protruding from the barrel wall to pass through.

In some preferred embodiments, the screen assembly includes a display panel, a corresponding display edge area of the display panel is fitted with an edge area of the electronic device, and the opening is located in the display panel.

In some embodiments, the lens unit further includes a second lens group including at least one lens, the first lens group and the second lens group spaced apart, and the first lens group and the second lens group are snap-fitted in corresponding snap grooves respectively, in which the external light is incident from the first lens group to the second lens group, and at least a part of the first lens group protrudes from the end surface of the lens barrel.

In some embodiments, when the first lens group includes a plurality of lenses, the plurality of lenses are connected sequentially along an incident direction of the external light.

In some embodiments, the first lens group includes a first lens and a second lens connected with the first lens; the external light is incident from the first lens to the second lens; and the second lens is snap-fitted and secured in the snap groove.

In some embodiments, the first lens group includes a plurality of lenses arranged sequentially, and adjacent lenses among the plurality of lenses are fixedly connected.

Technical solutions provided by embodiments of the present disclosure can include the following advantages.

As disclosed hereinabove, the end of the lens group on which the external light is incident protrudes from the end surface of the barrel wall of the lens barrel, that is, the outside of the end of the lens group is not surrounded by the barrel wall. Thus, compared with the case where the lens group is completely enclosed in the lens barrel, a volume of an end portion of the lens barrel can be reduced, which is advantageous to miniaturization of the lens unit; especially when the lens unit is used as a front camera of the electronic device, the size of the opening provided in the screen assembly of the electronic device for the lens unit to pass through, can be reduced, thereby improving a screen-to-body ratio.

It should be understood that the above general description and the following detailed description are intended to be exemplary and illustrative, and are not constructed to limit the present disclosure.

BRIEF DESCRIPTION OF THE DRAWINGS

Drawings herein are incorporated into the specification and constitute a part of the specification, and embodiments consistent with the present disclosure are illustrated, and together with the specification, serve to explain the principles of the present disclosure.

FIG. 3 illustrates a schematic view of still another lens unit according to an exemplary embodiment of the present disclosure.

FIG. 4 illustrates a flow chart of a processing method for a lens unit according to an exemplary embodiment of the present disclosure.

DETAILED DESCRIPTION

Exemplary embodiments will be described in detail herein, examples of which are illustrated in the accompanying drawings. When the following description refers to the drawings, the same numerals in the different figures represent the same or similar elements, unless indicated otherwise. The implementations described in the following exemplary embodiments do not represent all the implementations consistent with the present application. Instead, they are merely examples of devices and methods consistent with some aspects of the present application as detailed in the appended claims.

Terms used in the present disclosure are only for the purpose of describing specific embodiments, and should not be construed to limit the present disclosure. As used in the present disclosure and the appended claims, "a", "the" and "this" in singular forms mean including plural forms, unless clearly indicated in the context otherwise. It should also be understood that, as used herein, the term "and/or" represents and contains any one and all possible combinations of one or more associated listed items.

It should be understood that although terms such as "first," "second" and "third" are used herein for describing various information, the information should not be limited by these terms. These terms are only used to distinguish the same type of information from each other. For example, without departing from the scope of the present application, the first information may also be referred to as the second information, and similarly, the second information may also be referred to as the first information. As used herein, the term "if" may be construed to mean "when" or "upon" or "in response to determining", depending on the context.

Figure 1:
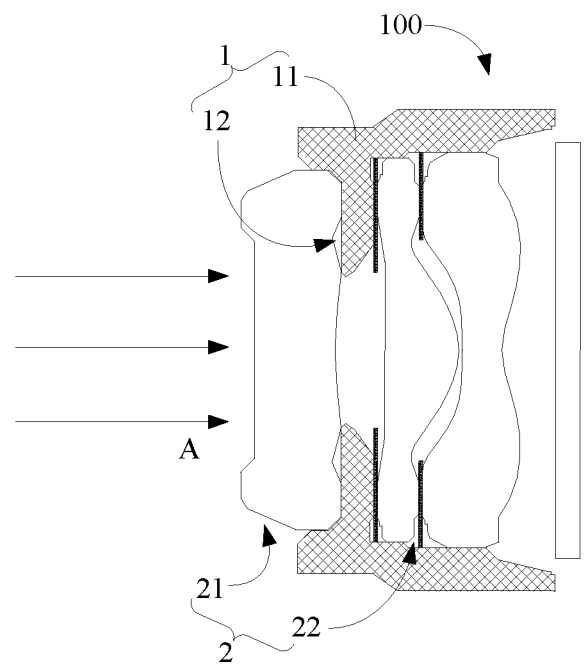
FIG. 1 illustrates a schematic view of a lens unit according to an exemplary embodiment of the present disclosure.

FIG. 1 illustrates a schematic view of a lens unit according to an exemplary embodiment of the present disclosure. As illustrated in FIG. 1, a lens unit 100 can include a lens barrel 1 and a lens group 2 fitted in the lens barrel 1. The lens barrel 1 can include a barrel wall 11 and a snap groove 12 surrounded and formed by the barrel wall 11. The snap groove 12 can be snap-fitted with the lens group 2 to secure and limit the lens group 2. The lens group 2 can be pressed into the snap groove 12 by a press-in device, so as to be secured; alternatively, the snap groove 12 can be provided with a snap-fit structure to secure the lens group 2 through the snap-fit structure.

One end of the lens group 2 on which external light is incident protrudes from an end surface of the barrel wall 11, that is, the end of the lens group 2 on which the external light is incident is not surrounded by the barrel wall 11. Thus, compared with the case where the lens group 2 is completely enclosed in the lens barrel 1, a volume of an end portion of the lens barrel 1 can be reduced, which is advantageous to miniaturization of the lens unit 100. Especially when the lens unit 100 is used as a front camera of an electronic device, a size of an opening in a screen assembly of the electronic device, through which the lens unit 100 passes, can be reduced, thereby improving a screen-to-body ratio.

In an embodiment, still referring to FIG. 1, the lens group 2 can include a first lens group 21 and a second lens group 22; the first lens group 21 and the second lens group 22 are spaced apart in an incident direction A of the external light. The external light may be incident from the first lens group 21 to the second lens group 22, and exit from the second lens group 22, in which at least a part of the first lens group 21 protrudes from the end surface of the barrel wall 11.

Figure 2:
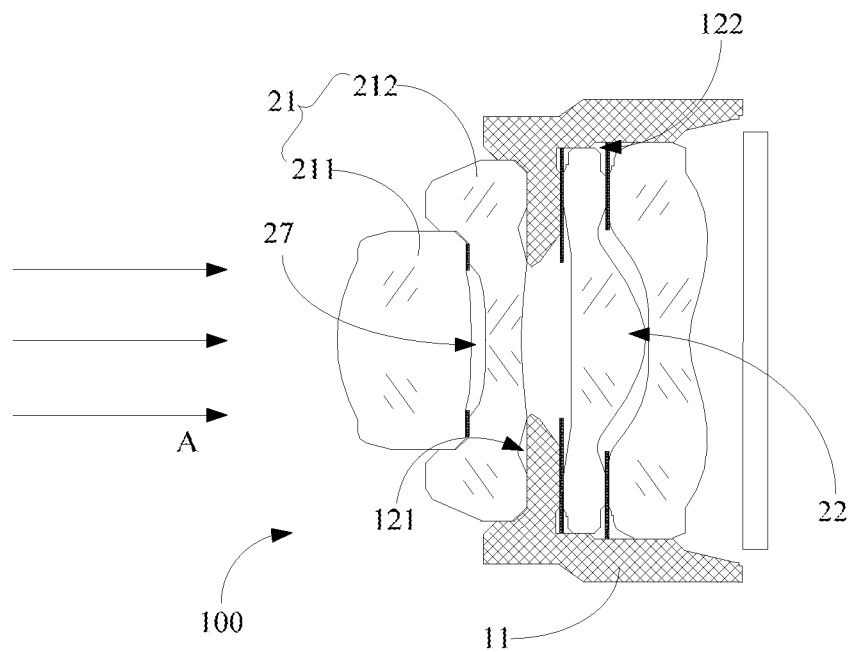
FIG. 2 illustrates a schematic view of another lens unit according to an exemplary embodiment of the present disclosure.

The first lens group 21 and the second lens group 22 can be snap-fitted and secured in corresponding snap grooves respectively. For example, as illustrated in FIG. 2, the snap groove can include a first snap groove 121 and a second snap groove 122. The first lens group 21 is directly snap-fitted and secured in the first snap groove 121, and the second lens group 22 is directly snap-fitted and secured in the second snap groove 122.

In this embodiment, the first lens group 21 can include only one lens, as illustrated in FIG. 1; alternatively, the first lens group 21 can include a plurality of lenses, and the plurality of lenses can be sequentially connected along the incident direction A of the external light. For example, still as illustrated in FIG. 2, the first lens group 21 may include a first lens 211 and a second lens 212 connected with the first lens 211, and the external light may be incident from the first lens 211 to the second lens 212. The second lens 212 can be snap-fitted and secured in the snap groove. The first lens 212 can protrude completely from the end surface of the barrel wall 11, or the first lens 211 can also partially protrude from the end surface of the barrel wall 11. Adjacent lenses can be connected by bonding, and for example, opposite surfaces of the first lens 211 and the second lens 212 are bonded.

It should be noted that in the above embodiment, the second lens group 22 can also include one lens or a plurality of lenses; when the second lens group 22 includes a plurality of lenses, each lens may be connected to an adjacent lens, or there may be a certain interval among the lenses, which will not be elaborated herein. Adjacent lenses can also be connected by bonding, which is not limited in the present disclosure.

In another embodiment, as illustrated in FIG. 3, the lens group 2 can include a plurality of lenses arranged in sequence, and each lens is fixedly connected to an adjacent lens. In other words, all the lenses contained in the lens unit 100 are connected and stacked in a thickness direction to constitute a whole body, and then are snap-fitted and secured in snap grooves 12 of the lens barrel 1, to increase a length of the lens group 2 that can protrude from the end surface of the barrel wall 11 as much as possible. By way of example, the lens group 2 can include a third lens 23, a fourth lens 24, a fifth lens 25, and a sixth lens 26, and the third lens 23, the fourth lens 24, the fifth lens 25, and the sixth lens 26 included by the lens group 2 can be connected sequentially. The third lens 23 completely protrudes from the end surface of the barrel wall 11, and a part of the fourth lens 24 protrudes from the end surface of the barrel wall 11.

In the above embodiments, still as illustrated in FIG. 3, the lens group 2 can further include a recessed portion 27, and the recessed portion 27 may be formed by a lens included in the lens group 2 being recessed along the incident direction of the light, so as to position an adjacent lens.

By way of example, in the embodiment illustrated in FIG. 2, the recessed portion 27 can be formed by the second lens 212 being recessed toward the incident direction of the light, and a part of the first lens 211 is disposed inside the recessed portion 27, thereby determining the relative positional relationship between the first lens 211 and the second lens 212. For another example, as illustrated in FIG. 3, the recessed portion 27 can be formed by the fourth lens 24 being recessed in the incident direction of the external light; a plurality of such recessed portions 27 can be provided. As illustrated in FIG. 3, the sixth lens 26 can also be recessed along the incident direction A of the external light to form the recessed portion 27.

Based on the technical solution of the present disclosure, as shown in FIG. 3, the lens unit 100 can further include a light shielding layer 3, and the light shielding layer 3 can be attached to an edge area of at least one lens included in the lens group 2 to block stray light and avoid affecting imaging of a camera module. For example, as illustrated in FIG. 3, the light shielding layer 3 can be formed on the edge area of each lens. The light shielding layer 3 may be formed on a surface of the lens for the external light to enter, or may be formed on a surface of the lens for the external light to exit, or may be formed on both of an incident surface and an exit surface of the lens, which is not limited in the present disclosure. The light shielding layer 3 can be formed by an ink coating process.

Based on the technical solution of the present disclosure, a processing method for the lens unit 100 is further provided.

As illustrated in FIG. 4, the processing method can include: securing a lens group 2 in a snap groove 12 of a lens barrel 1, and causing one end of the lens group 2 on which the external light is incident to protrude from an end surface of the lens barrel 1, as indicated in block 401.

In this embodiment, the lens barrel 1 can include a barrel wall 11, and the end of the lens group 2 on which the external light is incident protrudes from the end surface of the barrel wall 11.

In an embodiment, when the lens group 2 includes a plurality of lenses arranged sequentially, adjacent lenses may be first connected to obtain the lens group 2, and then the resulting lens group 2 may be secured in the snap groove 12 of the lens barrel 1.

In another embodiment, the lens group 2 can include a first lens group 21 and a second lens group 22 that are spaced apart in an incident direction of the external light, and the external light is incident from the first lens group 21 to the second lens group 22. The second lens group 22 can be secured to the corresponding snap groove within the lens barrel 1, and the first lens group 21 can be secured to the corresponding snap groove within the lens barrel 1 and a part of the first lens group 21 protrudes beyond the end surface of the lens barrel 1.

When the first lens group 21 includes a plurality of lenses, and adjacent lenses can be connected sequentially along the incident direction of the external light to obtain the first lens group 21, and then the first lens group 21 is assembled in the corresponding snap groove 12 of the lens barrel 1.

In the above embodiment, the adjacent lenses can be secured by glue bonding.

In block 402, the lens group 2 is subjected to a matting treatment to obtain the lens unit 100.

In this embodiment, the imaging quality of the lens barrel 1 can be improved by forming a light shielding layer 3 on the lens group 2 and blocking the external stray light through the light shielding layer 3. The light shielding layer 3 can be formed on the lens included in the lens group 2 by an ink coating process, and for example, can be formed on an edge area of the lens.

Based on the technical solution of the present disclosure, a camera module is also provided. The camera module may include the lens unit described in any one of the above embodiments; or the camera module may include a lens barrel formed by the process as described in FIG. 4. Further, the camera module may further include an electronic component such as an image sensor and a motor.

Figure 5:
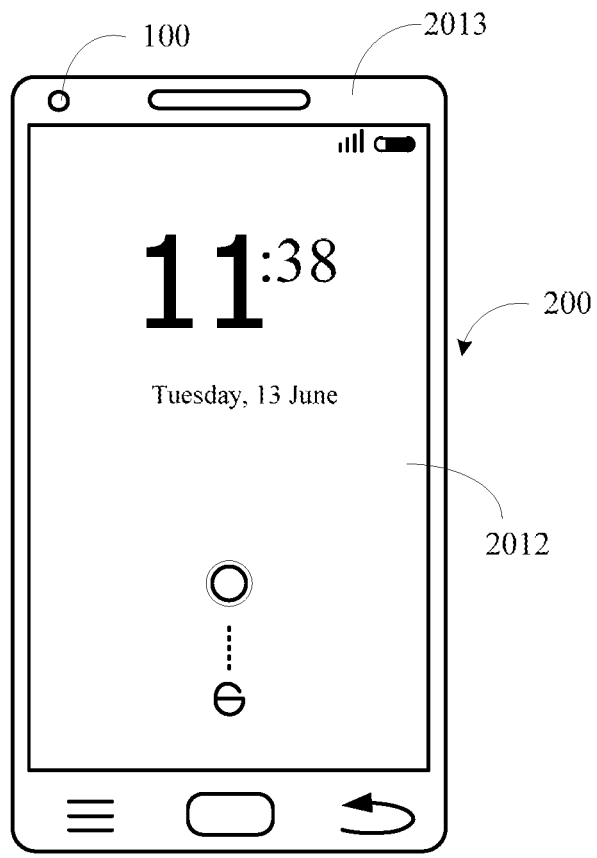
FIG. 5 illustrates a schematic view of an electronic device according to an exemplary embodiment of the present disclosure.
Figure 6:
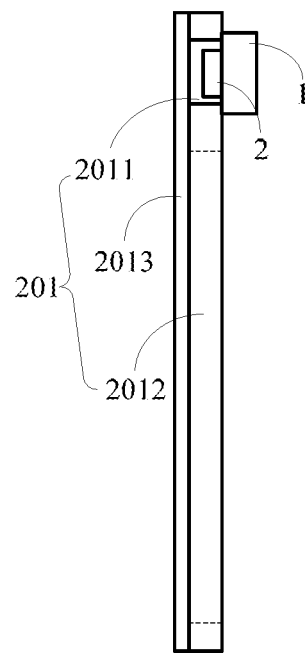
FIG. 6 illustrates a sectional view of an electronic device according to an exemplary embodiment of the present disclosure.

The camera module can be assembled to an electronic device, and the electronic device is herein exemplified as a mobile phone terminal 200 shown in FIG. 5 and will be described in detail. As illustrated in FIG. 5, the camera module is installed within the mobile phone terminal 200, and acts as a front camera of the mobile phone terminal 200, such that the user can take selfies or videos by the camera module. The mobile phone terminal 200 can include a screen assembly 201. As shown in FIG. 6, the screen assembly 201 can include an opening 2011, and the opening 2011 can be used for a part of the lens group 2 protruding from the barrel wall 11 to pass through, which can obviously reduce the size of the opening 2011, improve strength of the screen assembly 201, and facilitate the increase of the screen-to-body ratio, compared with the case where the barrel wall 11 needs to pass through the opening.

In an embodiment, still as illustrated in FIG. 6, the screen assembly 201 can include a display panel 2012 and a front panel 2013 that cooperates with the display panel 2012. The display panel 2012 can be used to display image information of the mobile phone terminal 200, and the front panel 2013 can include a shielding area around the display panel 2012 to shield a circuit board and related electronic components within the mobile phone terminal 200. The opening 2011 can be provided in the shielding area of the front panel 2013, or the opening 2011 can be provided in the display panel 2012.

Figure 7:
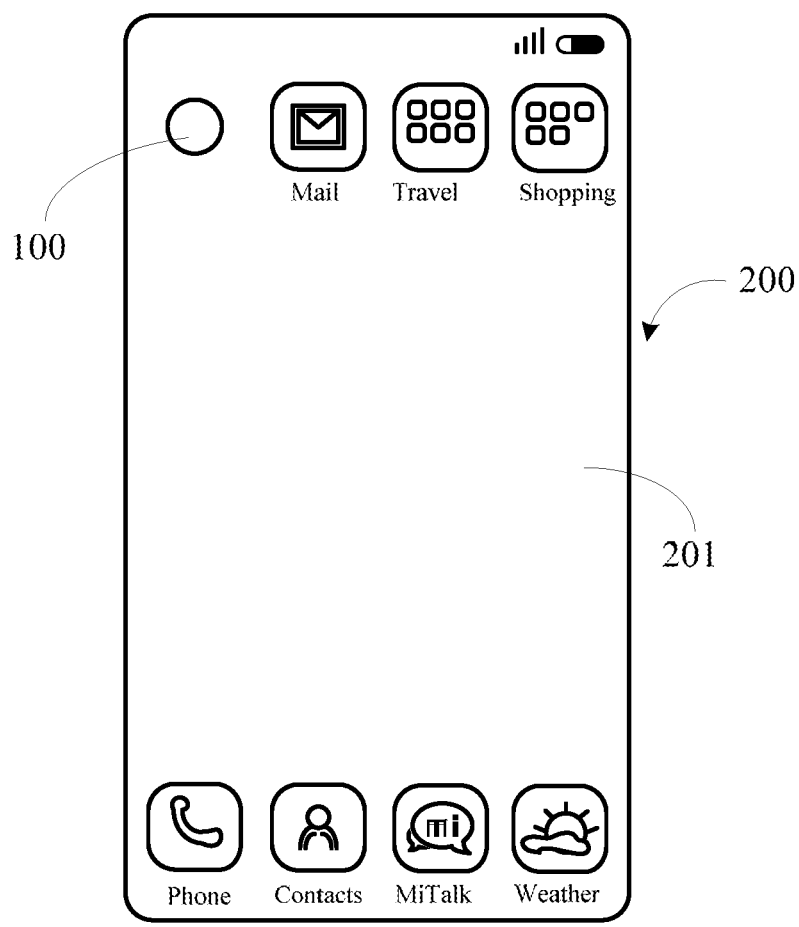
FIG. 7 illustrates a schematic view of another electronic device according to an exemplary embodiment of the present disclosure.

In another embodiment, as illustrated in FIG. 7, the screen assembly 201 can include a display panel 2012, and an edge of a corresponding display area of the display panel 2012 substantially is fitted with an edge of the mobile phone terminal 200. In such a case, the opening 2011 is located in the display panel 2012, and since the barrel wall 11 does not need to pass through the opening 2011, the screen-to-body ratio of the mobile phone terminal 200 can be further improved.

Upon consideration of the specification and practice of the disclosure herein, those skilled in the art will readily appreciate other embodiments of the present disclosure. The present application is intended to cover any variations, uses, or adaptations of the present disclosure, which are in accordance with the general principles of the present disclosure and include common knowledge or conventional technical means in the art that are not disclosed herein. The specification and embodiments are only considered to be exemplary, and the true scope and spirit of the present disclosure is indicated by the following claims.

It should be understood that the present disclosure is not limited to the specific structures described above and illustrated in the drawings, and can include various modifications and changes, without departing from the scope of the present disclosure. The scope of the present disclosure is limited only by the appended claims.

The invention claimed is:

1. A lens unit, comprising:
   a lens barrel having
      a barrel wall and
      a snap groove surrounded and formed by the barrel wall; and
   a first lens group snap-fitted and secured in the snap groove, wherein
      the first lens group has a light-incident end on which external light incidents;
      the light-incident end protrudes from an end surface of the barrel wall; and
   wherein the first lens group comprises a first lens and a second lens connected with the first lens;
   the external light is incident from the first lens to the second lens; and
   the second lens is snap-fitted and secured in the snap groove,
   wherein the first lens protrudes completely from the end surface of the barrel wall;
   wherein the second lens has a recessed portion with an annular rim portion formed on a surface of the second lens, a part of the first lens is disposed inside the recessed portion, and the annular rim portion surrounds a periphery of the first lens;
   wherein the snap groove is defined by an annular protrusion formed on an inner wall of the lens barrel; and
   wherein the second lens protrudes partially from the end surface of the barrel wall.

2. The lens unit according to claim 1, further comprising a second lens group comprising at least one lens, wherein:
   the first lens group and the second lens group are spaced apart;
   the first lens group and the second lens group are snap-fitted in, corresponding snap grooves respectively;
   the external light is incident from the first lens group to the second lens group; and
   at least a part of the first lens group protrudes from the end surface of the lens barrel.

3. The lens unit according to claim 2, wherein:
   the first lens group comprises a plurality of lenses; and
   the plurality of lenses are connected sequentially along an incident direction of the external light.

4. The lens unit according to claim 1, wherein:
   the first lens group comprises a plurality of lenses arranged sequentially; and
   adjacent lenses among the plurality of lenses are fixedly connected.

5. The lens unit according to claim 1, wherein adjacent lenses in a connected state contained in the first lens group are connected by bonding.

6. The lens unit according to claim 1, further comprising a light shielding layer wherein the light shielding layer is attached to an edge area of at least one lens contained in the first lens group to block stray light.

7. A processing method for a lens unit wherein the lens unit comprises a lens barrel and a first lens group comprising a first lens and a second lens, said processing method comprising:
   securing the first lens group in a first snap groove within the lens barrel, wherein the second lens is directly secured in the first snap groove, wherein the second lens has a recessed portion with an annular rim portion formed on a surface of the second lens, a part of the first lens is disposed inside the recessed portion, and the annular rim portion surrounds a periphery of the first lens, and wherein the snap groove is defined by an annular protrusion formed on an inner wall of the lens barrel;
   causing one end of the first lens group on which external light is incident to protrude from an end surface of the lens barrel, wherein the first lens protrudes completely from the end surface of the barrel wall and the second lens protrudes partially from the end surface of the barrel wall; and
   subjecting the first lens group to a matting treatment to obtain the lens unit.

8. The processing method according to claim 7, wherein the first lens group comprises a plurality of lenses arranged sequentially, and the step of securing the first lens group in a first snap groove within the lens barrel further comprises:
   connecting adjacent lenses to obtain the first lens group; and
   securing the first lens group in the first snap groove.

9. The processing method according to claim 7, wherein:
   the lens unit further comprises a second lens group comprising at least one lens;
   the first lens group and the second lens group are spaced apart;
   the external light is incident from the first lens group to the second lens group; and
   wherein the method further comprises:
      securing the second lens group in a second snap groove within the lens barrel before securing the first lens group in the first snap groove within the lens barrel; and
      causing a part of the first lens group to protrude from the end surface of the lens barrel.

10. The processing method according to claim 9, wherein the first lens group comprises a plurality of lenses, and the securing the first lens group in the first snap groove within the lens barrel further comprises connecting adjacent lenses to obtain the first lens group.

11. The processing method according to claim 8, wherein connecting adjacent lenses comprises bonding opposite surfaces of the adjacent lenses by glue.

12. The processing method according to claim 10, wherein connecting adjacent lenses comprises bonding opposite surfaces of the adjacent lenses by glue.

13. An electronic device, comprising:
a screen assembly; and
a lens unit comprising:
a lens barrel comprising a barrel wall and a snap groove surrounded and formed by the barrel wall, and
a first lens group snap-fitted and secured in the snap groove, wherein:
the first lens group has a light-incident end on which external light incidents;
the light-incident end protrudes from an end surface of the barrel wall; and
wherein the first lens group comprises a first lens and a second lens connected with the first lens;
the external light is incident from the first lens to the second lens; and
the second lens is snap-fitted and secured in the snap groove,
wherein the first lens protrudes completely from the end surface of the barrel wall;
wherein the second lens has a recessed portion with an annular rim portion formed on a surface of the second lens, a part of the first lens is disposed inside the recessed portion, and the annular rim portion surrounds a periphery of the first lens;
wherein the snap groove is defined by an annular protrusion formed on an inner wall of the lens barrel; and
wherein the second lens protrudes partially from the end surface of the barrel wall.

14. The electronic device according to claim 13, wherein the screen assembly comprises a display panel, a corresponding display edge area of the display panel is fitted with an edge area of the electronic device, and an opening is located in the display panel.

15. The electronic device according to claim 13, wherein the lens unit further comprises a second lens group comprising at least one lens, the first lens group and the second lens group are spaced apart, and the first lens group and the second lens group are snap-fitted in corresponding snap grooves respectively;
wherein the external light is incident from the first lens group to the second lens group, and at least a part of the first lens group protrudes from the end surface of the barrel wall.

16. The electronic device according to claim 15, wherein when the first lens group comprises a plurality of lenses, the plurality of lenses are connected sequentially along an incident direction of the external light.

17. The electronic device according to claim 15, wherein the first lens group comprises a first lens protruding completely from the end surface of the barrel wall, and a second lens connected with the first lens and protruding partially from the end surface of the barrel wall; the external light is incident from the first lens to the second lens; and the second lens is snap-fitted and secured in the snap groove.

18. The electronic device according to claim 13, wherein the first lens group comprises a plurality of lenses arranged sequentially, and adjacent lenses among the plurality of lenses are fixedly connected, the second lens group comprises a third lens, a fourth lens, a fifth lens, and a sixth lens, and wherein the third lens protrudes completely from the end surface of the barrel wall and the fourth lens protrudes partially from the end surface of the barrel wall.

* * * * *